United States Patent [19]
Redeker et al.

[11] Patent Number: 4,509,892
[45] Date of Patent: Apr. 9, 1985

[54] APPARATUS FOR MANIPULATING WORKPIECES HAVING PLANE PARALLEL SURFACES

[75] Inventors: Werner Redeker, Börnsen; Uwe Uhlig, Buchholz, both of Fed. Rep. of Germany

[73] Assignee: Hauni-Werke Körber & Co. KG, Hamburg, Fed. Rep. of Germany

[21] Appl. No.: 580,095

[22] Filed: Feb. 14, 1984

Related U.S. Application Data

[62] Division of Ser. No. 328,861, Dec. 9, 1981, Pat. No. 4,453,347.

[30] Foreign Application Priority Data

Dec. 13, 1980 [DE]  Fed. Rep. of Germany ....... 3047035

[51] Int. Cl.³ ............................................. B23Q 7/14
[52] U.S. Cl. .................... 414/223; 414/590; 414/680; 51/215 AR; 198/480; 198/403; 198/690
[58] Field of Search ............................ 414/222–225, 414/744 B, 744 C, 751, 590, 680, 729, 730; 198/689, 690, 478, 480, 403; 51/108 R, 215 R, 215 AR, 215 HM

[56] References Cited

U.S. PATENT DOCUMENTS

| | | | |
|---|---|---|---|
| 2,507,998 | 5/1950 | Russell | 51/108 R |
| 2,878,620 | 3/1959 | Calehuff | 198/608 X |
| 3,399,498 | 9/1968 | Lampani et al. | 51/108 R X |
| 3,490,575 | 1/1970 | Herrmann | 198/404 X |
| 3,730,356 | 5/1973 | Bossons et al. | 198/689 X |
| 3,893,562 | 7/1975 | Hurst | 198/480 |

FOREIGN PATENT DOCUMENTS 55-42748  3/1980  Japan ............................ 51/215 AR Primary Examiner—Joseph E. Valenza
Assistant Examiner—Terrance L. Siemens
Attorney, Agent, or Firm—Peter K. Kontler

[57] ABSTRACT

Apparatus for supporting, locating and transferring plate-like or disc-shaped workpieces between several stations or between several machines where each of two plane parallel surfaces of each workpiece is subjected to one or more treatments has at least two partially overlapping plate chucks. A workpiece which is introduced by one chuck into the space where the two chucks overlap is released by the one chuck and is then attracted by the other chuck so that the previously exposed surface of the workpiece becomes concealed and vice versa. The chucks can transport workpieces between successive stations of a series of stations where the surfaces of the workpieces can be subjected to a coarse and thereupon to a precision or final treatment such as grinding and polishing, lapping or honing. If the chucks are installed in a separate frame, they can be rotated through 180° about an axis which is parallel to their work-contacting surfaces so that a workpiece between such chucks is inverted, i.e., its upper side becomes its underside and vice versa. The chucks may be equipped with permanent magnets and/or electromagnets to selectively attract and release the workpieces.

5 Claims, 4 Drawing Figures

APPARATUS FOR MANIPULATING WORKPIECES HAVING PLANE PARALLEL SURFACES

This application is a division of application Ser. No. 328,861, filed Dec. 9, 1981, now U.S. Pat. No. 4,453,347.

BACKGROUND OF THE INVENTION

The present invention relates to apparatus for manipulating workpieces, especially for manipulating workpieces having pairs of substantially plane parallel surfaces. More particularly, the invention relates to improvements in apparatus for supporting, locating and transferring workpieces for treatment at a plurality of stations, such as successive stations of a surface grinding machine whose tools serve to treat each of the plane parallel surfaces on metallic valve heads or other types of workpieces having pairs of spaced parallel surfaces.

Heretofore known techniques of manipulating workpieces in a multi-station surface grinding machine, in another machine tool or in a production line which serves to treat several discrete surfaces of a series of workpieces, especially plane parallel surfaces of flat workpieces, are cumbersome and time-consuming, mainly because each workpiece must be transferred by hand or by a mechanical transfer element from a first carrier which supports the workpieces in such a way that one surface of each supported workpiece is accessible and a second carrier serving to support each workpiece with a view to expose the other surface for treatment by one or more tools. As a rule, such rechucking of workpieces necessitates the presence of at least one attendant who removes successive workpieces of the series from a first carrier and transfers the removed workpieces to the next-following carrier (with or without inversion of workpieces during transfer). Therefore, machine tools or production lines which are used for such treatment of workpieces having pairs of plane parallel surfaces cannot form part of or constitute fully automated production lines because the treatment of workpieces in machine tools which have tools serving to remove material from two plane parallel surfaces of each workpiece is time consuming and, consequently, the installation of such machine tools in a production line would necessitate a slowdown or intermittent operation of each other machine in the respective production line. A surface grinding machine often subjects each surface of a workpiece to be treated to several treatments such as preliminary (coarse or rough) grinding and a secondary (final or precision) grinding. The carriers which support, locate and transfer the workpieces between successive stations may constitute so-called plate chucks which are movable, in their entirety, between neighboring stations or which include portions adapted to move successive workpieces from a preceding station to the next-following station.

OBJECTS AND SUMMARY OF THE INVENTION

An object of the invention is to provide a novel and improved apparatus which can support, locate and transfer workpieces, especially workpieces having pairs of plane parallel surfaces, between successive treating stations of a machine tool, such as the stations of a surface grinding machine, or between successive machine tools, without any assistance from attendants.

Another object of the invention is to provide a fully or partially automated apparatus of the above outlined character which renders it possible to install the machine tool wherein the apparatus is used in a production line for mass-manufacture or mass-treatment of workpieces having pairs of plane parallel surfaces.

A further object of the invention is to provide the apparatus with novel and improved means for rechucking successive workpieces or successive groups of workpieces for causing the workpieces to leave a preceding carrier and to be held by the next-following carrier.

An additional object of the invention is to provide a self-sustaining work supporting, locating and transferring apparatus which can be installed in existing production lines or associated with conventional machines for the treatment of workpieces having pairs of substantially or exactly plane parallel surfaces.

Another object of the invention is to provide the apparatus with novel and improved means for manipulating a large number of workpieces in a small area and with a degree of accuracy which cannot be achieved by manual handling of workpieces.

Still another object of the invention is to provide a machine tool, especially a surface grinding machine, which embodies the improved apparatus.

A further object of the invention is to provide a novel and improved method of supporting, locating and transferring (rechucking) disc-shaped, plate-like, pane-like or analogous workpieces, especially magnetizable workpieces, preparatory to and during treatment of their plane parallel surfaces at a plurality of successive stations.

The invention is embodied in an apparatus for supporting, locating and transferring workpieces (particularly workpieces of the type having pairs of at least substantially plane parallel surfaces) for treatment at a succession of stations (for example, at the stations of a surface grinding machine wherein each of the two plane parallel surfaces of each of a series of workpieces can be subjected to a preliminary and/or finishing treatment). The apparatus comprises at least two spaced-apart work carriers (such as magnetic plate chucks) having surfaces facing and at least partially overlapping each other. Each of the carriers is activatable (e.g., energizable if the carriers are or include electromagnets) to attract workpieces and deactivatable (e.g., deenergizable) to release such workpieces so that a workpiece between the surfaces of the carriers can be transferred from one of the carriers to the other carrier by deactivating the one carrier while the other carrier is activated (and/or vice versa).

The apparatus further comprises means for moving the carriers relative to each other, e.g., for rotating the carriers about parallel axes. In such apparatus, the aforementioned surfaces of the carriers are preferably parallel to each other and at least substantially normal to the axes of rotation.

The aforementioned stations can include at least one discrete station for each carrier, and the stations can but need not be immediately or closely adjacent to the respective carriers. The stations can constitute or include a series of successive stations, and the moving means can be arranged to effect the transport of workpieces to successive stations through the medium of the respective carriers.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
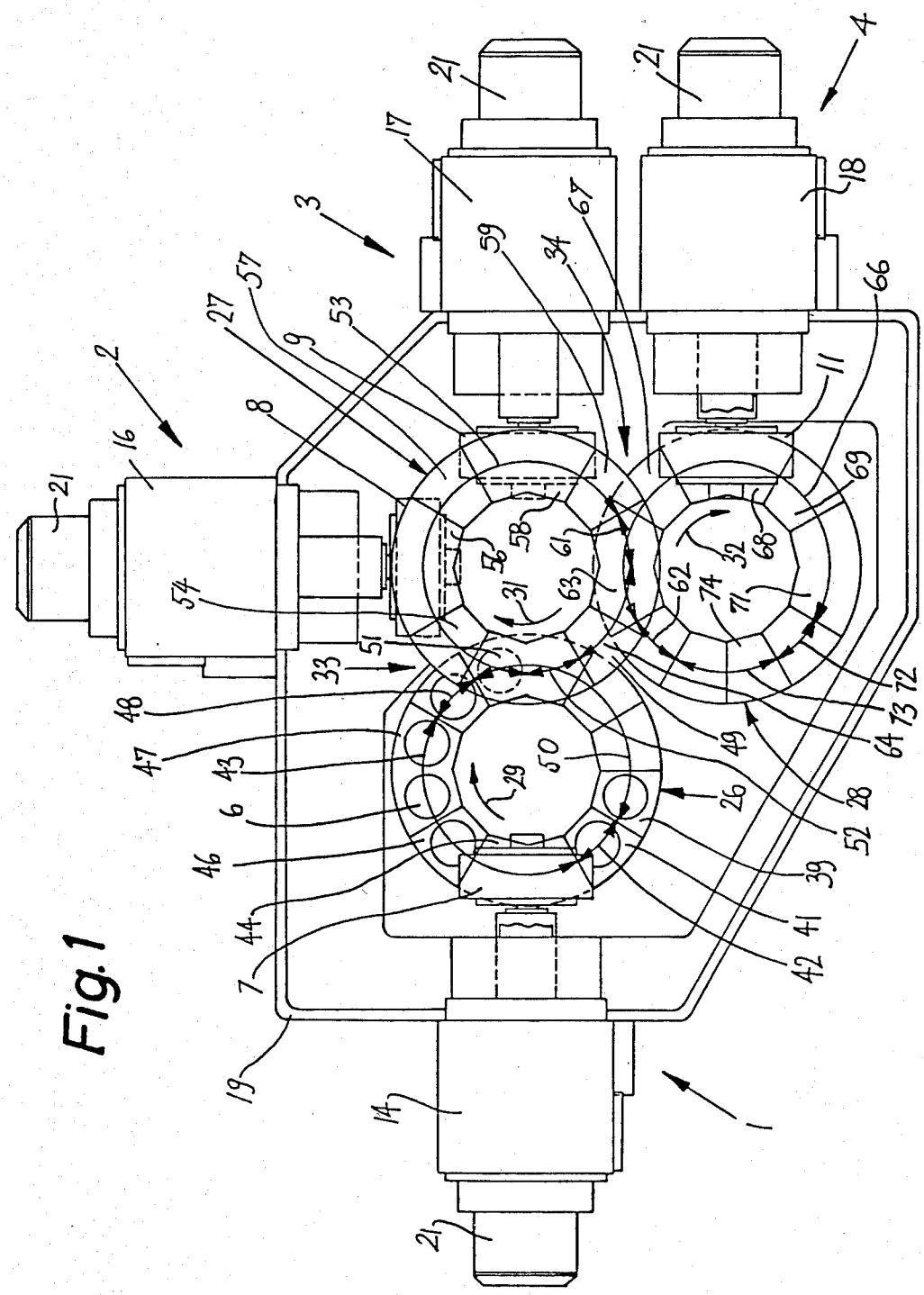
FIG. 1 is a plan view of an apparatus which is incorporated in a surface grinding machine and is constructed and assembled in accordance with one embodiment of the invention.
Figure 2:
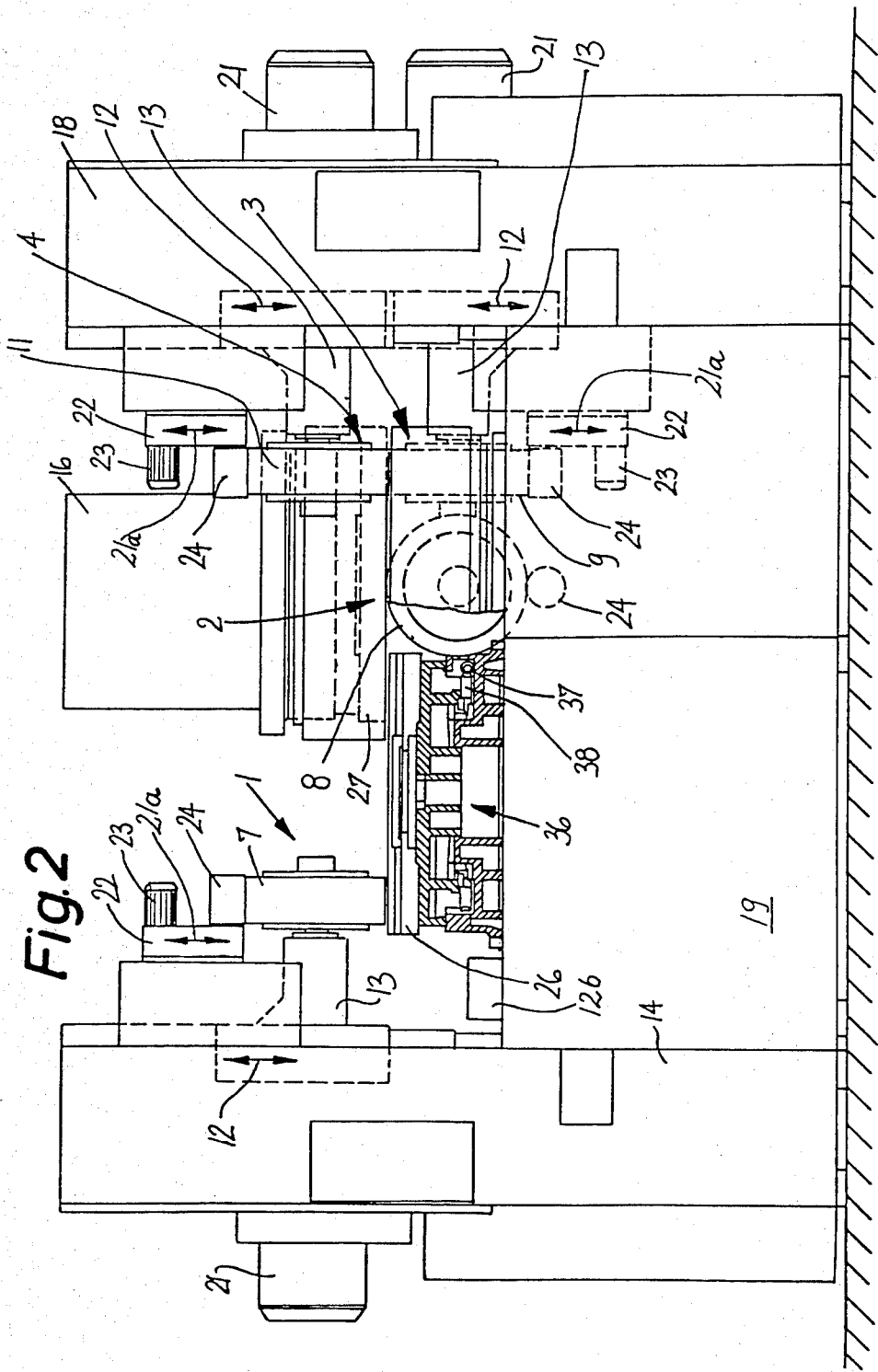
FIG. 2 is a front elevational view of the apparatus which is shown in FIG. 1, with certain parts shown in a vertical sectional view.

FIGS. 1 and 2 show an apparatus which serves to support, locate or position and transfer flat plate- or disc-shaped workpieces 6 in a surface grinding machine with a series of four successive treating stations 1, 2, 3 and 4. The illustrated grinding machine is a so-called circular indexing table machine which can be used, e.g., for surface treatment of plane parallel surfaces on workpieces in the form of valve plates or valve heads. The action of grinding tools which are used in the grinding machine of FIGS. 1 and 2 is a so-called circumferential grinding action, i.e., the surfaces of the workpieces 6 are treated by the circumferential or peripheral (working or active) surfaces of rotary grinding wheels 7, 8, 9 and 11 which are respectively disposed at the stations 1, 2, 3 and 4.

Each of the grinding wheels 7, 8, 9, 11 is mounted on a discrete holder or head 13 which is movable up and down (note the double-headed arrows 12 in FIG. 2). The four holders 13 are movable up and down in discrete upright frame members 14, 16, 17 and 18 whose lower end portions rest on and are secured to a common base or bed 19 of the grinding machine. Each of the grinding wheels 7, 8, 9 and 11 is or can be driven by a discrete motor 21, and each grinding wheel is associated with one of four discrete dressing units 22 which are movable in directions indicated by double-headed arrows 21a. Each dressing unit 22 comprises a motor 23 for a rotary dressing tool 24 provided with fragments of diamonds serving to treat the active surface of the corresponding grinding wheel.

The means for manipulating (including supporting, locating or positioning and transferring) the workpieces 6 includes a composite work holder having three discrete carriers in the form of plate chucks 26, 27 and 28. The carriers 26 and 28 are disposed in a common horizontal plane at the grinding stations 1 and 4, and the carrier 27 is disposed in a second plane at a level above the plane of the carriers 26, 28 so that its underside or surface partially overlaps portions of but is spaced apart from the upper sides or surfaces of the carriers 26 and 28. The (rechucking) regions or zones of partial overlap are shown at 33 and 34, i.e., the carrier 27 partially overlaps the carrier 26 in the region 33 and the carrier 27 partially overlaps the carrier 28 in the region 34. The carriers 26 to 28 are rotatable or indexible about parallel vertical axes which are normal to the underside of the carrier 27 and to the upper sides of the carriers 26, 28.

Each of the carriers 26, 27, 28 is an electromagnetic plate chuck, for example, of the class known as type 122 with segmental pole distribution and disconnectable segments as manufactured by the firm Wagner KG, Heimertingen, Bavaria, Federal Republic Germany. The directions in which the carriers 26, 27 and 28 can rotate are respectively indicated by arrows 29, 31 and 32. It will be noted that the axis of rotation of the central carrier 27 is located at the apex and the axes of rotation of the carriers 26, 28 are located at the other two corners of an isosceles triangle whose hypotenuse extends between the axes of the carriers 26, 28.

As will be explained in greater detail hereinbelow, the workpieces 6 are placed or delivered onto the carrier 26 in a region where the carrier 26 is not overlapped by the carrier 27. Successive workpieces 6 are thereupon treated by the grinding wheel 7 at the station 1 prior to being transferred to the underside of the carrier 27 in the region 33. The carrier 27 thereupon transports successive workpieces 6 into the range of the grinding wheels 8 and 9 at the stations 2 and 3 prior to transfer of successive workpieces onto the upper side of the carrier 28 in the region 34 of overlap of the carriers 27 and 28. The carrier 28 thereupon transports successive workpieces 6 into the range of the grinding wheel 11 at the station 4 before the finished workpieces are removed, either by hand or by automatic or semiautomatic equipment, for delivery to the next processing station, into storage or to a wrapping or other packing station.

FIG. 2 schematically shows a means 126 for activating and deactivating (i.e., energizing and deenergizing) selected portions or sectors of the carrier 26 at selected intervals, e.g., in response to angular displacement of the carrier 26 through angles of predetermined magnitude. The exact design of the activating and deactivating means 126 forms no part of the present invention; it can comprise suitable coupling means which can connect successive or selected sectors of the carrier 26 to or disconnect such sectors from a source of electrical energy. It is clear that the improved apparatus further comprises suitable activating and deactivating means for the carriers 27 and 28; such means can be identical with the means 126 shown in FIG. 2.

The carriers 26, 27 and 28 can be replaced with chucks of the type having suction ports in their work-contacting surfaces, i.e., in the upper sides of chucks replacing the carriers 26, 28 and in the underside of the chuck replacing the carrier 27 of FIGS. 1 and 2. The activating and deactivating means then constitute or comprise valves, pipes and analogous components which can estabish and terminate connections between all or selected suction ports of a plate chuck and a suction generating device. For example, if the carriers 26 and 27 were replaced with chucks respectively having suction ports in their upper sides and in their undersides, the chuck replacing the carrier 27 could lift a workpiece off the upper side of the chuck replacing the carrier 26 by applying suction to the ports of the upper chuck while simultaneously disconnecting the ports of the lower chuck from the suction generating device. However, pneumatically operated chucks are not entirely satisfactory when the workpieces exhibit a large number of holes or have one or more relatively large holes so that suction cannot ensure adequate retention of workpieces in optimum positions and/or lifting of relatively heavy workpieces from a lower chuck to a chuck thereabove, even if the distance between the underside of the upper chuck and the upper side of the lower chuck only slightly exceeds the height of one or more workpieces therebetween. In such instances, we prefer to employ electromagnetic carriers which exhibit the additional advantage that they are less prone to malfunction than pneumatically actuatable chucks wherein the suction ports are likely to be clogged by dust and/or sprays of coolant which are invariably present in a grinding machine or the like.

As can be seen in FIG. 2, the grinding wheel 7 is installed at a level above the upper side of that portion of the carrier 26 which extends into the grinding station 1. This grinding wheel is assumed to be a coarse grinding tool which effects a preliminary or rough treatment of the upper side of a workpiece 6 on the upper side of the carrier 26. The grinding wheels 8 and 9 are disposed at the underside of the centrally located carrier 27, namely, between the regions 33 and 34, as considered in the direction of advancement of workpieces 6 from station to station. The grinding wheel 8 may constitute a tool whose function is identical with that of the grinding wheel 7, i.e., its active surface can subject the undersides of successive workpieces 6 to a coarse or preliminary treatment while the partially treated upper sides of such workpieces adhere to the underside of the carrier 27. The grinding wheel 9 may constitute a finishing or precision-treating tool which treats the pretreated undersides of successive workpieces 6 arriving from the station 2, and the grinding wheel 11 at the station 4 may be identical with or can perform the same function as the grinding wheel 9, namely, treat the pretreated upper sides of workpieces 6 resting on and adhering to the upper side of the carrier 28. The grinding wheel 11 is installed at a level above the upper side of the carrier 28 downstream of the region 34.

The reference character 36 denotes in FIG. 2 a means for moving the carrier 26 relative to the frame of the grinding machine and with reference to the other carrier or carriers. The moving means 36 includes a turntable defining the vertical axis about which the carrier 26 rotates. The means for driving the turntable of the moving means 36 includes a worm 37 receiving torque from a suitable motor, not shown, and a worm wheel 38 on the turntable. Each of the three carriers is driven by discrete moving means; the moving means for the carrier 27 is located at a level above the upper side of this carrier, and the moving means for the carrier 28 comprises a turntable which is analogous to the turntable of the moving means 36 and is located below the carrier 28.

The mode of operation of the apparatus which embodies the carriers 26, 27 and 28 will be described with reference to FIG. 2. For the sake of better understanding of the invention, the carriers 26 to 28 are assumed to be subdivided into a plurality of arcuate sectors having different lengths, as considered in the directions indicated by the respective arrows 29, 31 and 32. The arcuate double-headed arrows which are applied in FIG. 1 indicate the lengths of the corresponding sectors, but it will be appreciated that such lengths depend on a plurality of parameters such as the dimensions of the workpieces, the nature of treatment of workpieces at the grinding stations, the dimensions of the carriers, the advisability or possibility of simultaneously treating two or more workpieces by one and the same tool and/or others.

Successive workpieces 6 or successive groups of discrete workpieces 6 are placed onto the upper side of the carrier 26 at a loading zone 39 located ahead of the first grinding station 1, as considered in the direction of rotation of the carrier 26 with the turntable of the moving means 36 (arrow 29). The loading zone 39 is followed by a first inspection zone 41 where the workpieces 6 are examined or checked as to their number and accuracy or lack of accuracy of positioning with reference to the carrier 26. Furthermore, that electromagnet or those electromagnets of the carrier 26 which are located in the inspection zone 41 are energized so that the workpieces 6 are attracted to the upper side of the carrier 26 and normally do not change their positions during travel toward, past and beyond the first grinding station 1. This is indicated by the double-headed arrow 42. Those workpieces 6 which are properly positioned with reference to the carrier 26 are thereupon caused to advance through, past and beyond the first grinding station 1 where the upper sides of such workpieces are subjected to a preliminary or coarse treatment by the active surface of the grinding wheel 7. The electromagnet or electromagnets in the region denoted by the arrow 43 are energized so that the workpieces 6 continue to adhere to the upper side of the carrier 26 all the way from the inspection zone 41 to a second inspection zone 46 which follows the grinding or material removing zone 44 at the station 1. A workpiece 6 which reaches the inspection zone 46 is examined again in order to ascertain whether or not it is properly positioned with reference to the carrier 26, and the thus treated workpiece thereupon advances into a cleaning zone 47 which is equipped with means (such as brushes or the like, not shown) for removing dust and/or droplets constituting the remnants of a coolant. The zone 47 is followed by a demagnetizing zone indicated by a double-headed arrow 48 wherein the magnetic attraction between a freshly cleaned workpiece 6 and the carrier 26 is terminated but the workpiece continues to rest on the upper side of this carrier. Such demagnetization of the sector which carriers a freshly cleaned workpiece 6 takes place preparatory to entry of the workpiece into the region 33 of partial overlap between the upper side of the carrier 26 and the underside of the carrier 27. The region or zone where successive sectors of the carrier 27 are activated (energized) is indicated by a double-headed arrow 52; this zone is preceded by a zone 49 where successive increments of the underside of the carrier 27 are cleaned in order to ensure reliable adherence of the pretreated upper side of each workpiece 6 which is delivered by the carrier 26 to the region 33 of partial overlap between the carriers 26 and 27. The reference character 51 denotes those portions of the surfaces of the carriers 26, 27 which overlap each other in the region 33. That portion of the carrier 26 which is indicated by the double-headed arrow 50 is fully demagnetized and, since the carrier 27 is magnetized at 52 and thereupon all the way along the double-headed arrow 53, the carrier 27 automatically lifts each workpiece 6 which enters the region 33 so that the workpiece 6 then travels toward, past and beyond the grinding stations 2 and 3 without changing its position with reference to the carrier 27. The carrier 27 attracts the pretreated upper side or surface of each workpiece 6 which enters the region 33. Since the carrier 26 of FIG. 2 rotates clockwise (arrow 29) and the carrier 27 also rotates in a clockwise direction (arrow 31), these carriers are preferably driven in stepwise fashion and the transfer of successive workpieces 6 from the upper side of the carrier 26 onto or against the underside of the carrier 27 preferably takes place during successive intervals of idleness or dwell of such carriers.

However, it is equally within the purview of the invention to use the turntable of the moving means 36 for the carrier 26 and the other two turntables as a means for continuously rotating the respective carriers, i.e., also during transfer of workpieces 6 from the carrier 26 to the carrier 27 and from the carrier 27 to the carrier 28. This merely necessitates a reversal in the direction of rotation of the carrier 27 or a reversal in the direction of rotation of the carriers 26 and 28. For example, if the carrier 27 is driven in a counterclockwise direction, as viewed in FIG. 1, and at the speed of the carriers 26, 28, a workpiece 6 arriving at 33 can be transferred from the carrier 26 against the underside of the carrier 27 while the carriers 26, 27 are in motion, and a workpiece which arrives at 34 can be transferred from the underside of the carrier 27 onto the upper side of the carrier 28 while the carriers 27, 28 are in motion. This would necessitate a certain amount of regrouping, i.e., the carrier 28 should be more distant from the carrier 26 in order to provide room for the grinding stations 2 and 3 adjacent to that portion of the carrier 27 (it being assumed that this carrier rotates counterclockwise) which extends from the region 33 to the shifted region 34. For example, the carrier 28 can be moved to the three o'clock position of the carrier 27, as viewed in FIG. 1, so that the station 2 can be placed at the eight or seven o'clock position and the station 3 can be placed at the five or four o'clock position with reference to the carrier 27.

As mentioned above, those sectors or portions of the underside of the carrier 27 which extend along the arc described by the arrow 53 are energized so that they attract the workpieces 6 during transport toward, past and beyond the grinding stations 2 and 3. Before a workpiece 6 enters the grinding station 2, it is checked in a third inspection zone 54 in order to ascertain whether or not the transfer from carrier 26 to carrier 27 took place in the desired manner, i.e., whether or not the workpiece in the zone 54 is properly located or oriented with reference to the carrier 27 for proper treatment by the grinding wheel 8 at the station 2. The actual grinding zone where the workpieces 6 are treated by the active surface of the grinding wheel 8 is shown at 56. As mentioned above, the grinding wheel 8 completes a preliminary or coarse treatment of the undersides of successive workpieces 6 while the pretreated upper sides or surfaces of such workpieces adhere to the underside of the carrier 27.

A workpiece 6 which has advanced beyond the grinding zone 56 enters a fourth inspection zone 57 where it is checked as to the accuracy of its position and orientation prior to entering the grinding zone 58 at the station 3 where the freshly pretreated underside of such workpiece is subjected to the action of the peripheral surface of the grinding wheel 9 so that the treatment of such underside of the workpiece is completed not later than when the latter advances beyond the zone 58. This zone is followed by a fifth inspection zone 59 which includes means for ascertaining the quality of treatment including whether or not the undersides of the workpieces (still adhering to the underside of the carrier 27) are flat. the quality of the finish of such surfaces and the dimensions of the entire workpiece or of the finish-treated portion of each workpiece. The zone 59 can further serve as a cleaning station where the underside of an oncoming workpiece 6 is relieved of dust, droplets of coolant and/or other foreign matter.

Successive sectors or increments of the carrier 27 are deenergized (deactivated) in a zone 61 which follows the combined inspection and cleaning zone 59. Successive increments of the carrier 28 are energized in a zone 62 which is located ahead of the region 34 of partial overlap between the carriers 27 and 28 so that each sector of the carrier 28 which enters the region 34 is energized and can attract the finished underside of the oncoming workpiece 6 since the deenergization of successive increments of the carrier 27 takes place not later than on arrival at the region 34. The arrow 63 denotes the zone where the transfer of workpieces 6 from the underside of the carrier 27 onto the upper side of the carrier 28 takes place; such zone is located within the region (denoted by the arrow 64) where the carrier 27 is demagnetized. The carrier 28 is magnetized in the zone which is indicated by the arrow 66; it will be noted that the upper side of the carrier 28 attracts the respective workpieces 6 during transport of such workpieces toward, through and beyond the grinding station 4 where the pretreated upper sides of such workpieces are finish-treated by the grinding wheel 11. The freshly transferred workpieces 6 advance through a sixth inspection zone 67 prior to entering the actual grinding or finishing zone 68 at the station 4. The zone 68 is followed by a seventh or final inspection zone 69 where suitable instrumentalities check the quality of finish of the upper side of each workpiece 6, whether or not the surface is actually flat (or whatever configuration is desired), and/or whether or not the dimensions of the workpiece match the required or optimum dimensions. The workpieces 6 are thereupon transported into and beyond a cleaning zone 71 before reaching a zone 72 in which successive increments of the carrier 28 are deenergized. The zone 72 is followed by a zone 73 wherein the increments or sectors of the carrier 28 remain deenergized; such sectors advance the respective workpieces to a removing zone 74 where the finished workpieces are removed, either by hand or by an automatic or semiautomatic device of any known design.

As pointed out above, the apparatus of FIGS. 1 and 2 can be readily converted into an apparatus wherein the carriers 26 to 28 rotate during transfer of workpieces 6 from the upper side of the carrier 26 against the underside of the carrier 27 and from the underside of the carrier 27 onto the upper side of the carrier 28. This would merely necessitate a change in the direction of rotation of the carrier 27 or carriers 26, 28 and possibly some rearrangement of the grinding tools.

Furthermore, the apparatus of FIGS. 1 and 2 can be modified by mounting the carriers 26, 27 and 28 for rotation about parallel horizontal axes. The work-attracting surfaces of the carriers 26 to 28 are then located in vertical planes. The apparatus of FIGS. 1 and 2 is preferred at this time because it can be more readily incorporated in or associated with several types of existing grinding machines or other machine tools wherein the workpieces must be transported seriatim to each of several successive stations. Moreover, it is rather simple to move the grinding wheels up and down, i.e., toward and away from the underside of a carrier which supports the workpieces from above and toward and away from the upper side of a carrier on which the workpieces rest during transport and treatment.

The number of carriers can be reduced to two or increased to four or more. The illustrated apparatus with three carriers has been found to be ideally suited for use in a four-station grinding machine serving to treat workpieces having pairs of plane parallel surfaces and requiring treatment at each of their plane parallel surfaces. Still further, the centeral carrier 27 can be mounted at a level below the carriers 26, 28 if the carriers 26 and 28 are designed to attract workpieces to their undersides; the carrier 27 is then designed to attract workpieces to its upper side during transfer of workpieces from the region 33 to the region 34.

The apparatus of FIGS. 1 and 2 is especially suited for treatment of workpieces whose plane parallel surfaces require repeated treatment, i.e., a coarse treatment and thereupon a secondary or final treatment. As explained above, a workpiece which reaches the grinding station 1 exposes its upper side for coarse treatment by a first tool (7), the workpiece is thereupon rechucked at 33 so that it exposes its upper side first for a coarse and thereupon for a final or secondary treatment (at the stations 2 and 3 by the tools 8 and 9, respectively), and such workpiece is rechucked again at 34 so that it exposes its once treated upper side for final treatment by the tool 11 at the station 4. Thus, all that is necessary is to distribute the carriers 26 to 28 in such a way that the carrier 27 has sufficient room for transport of workpieces toward, past and beyond two stations prior to delivering such workpieces to the region 34.

Figure 3:
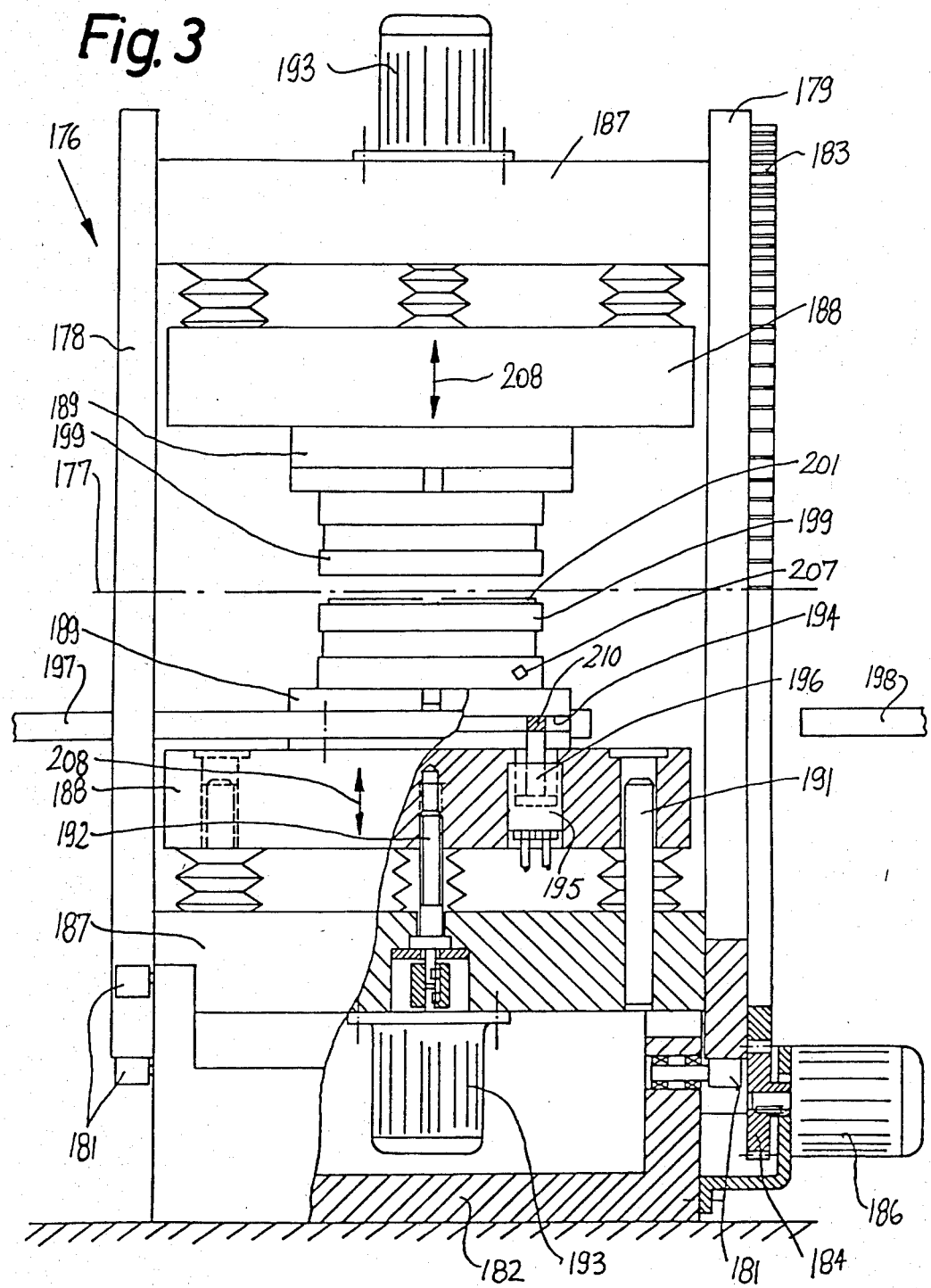
FIG. 3 is a side elevational view of a second apparatus which constitutes a self-sustaining structure, with a portion of the apparatus shown in a vertical sectional view.
Figure 4:
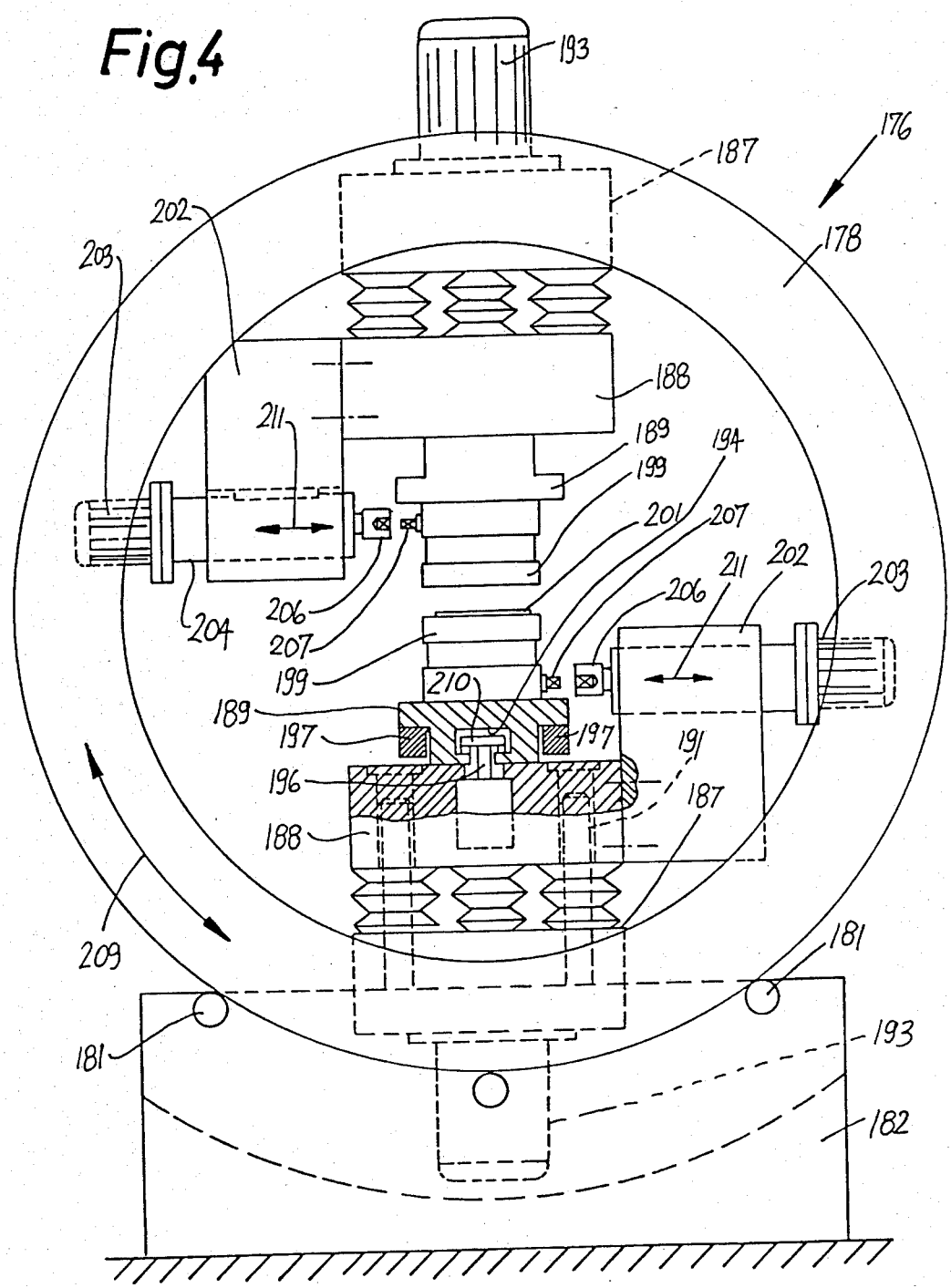
FIG. 4 is a view as seen from the left-hand side of FIG. 3, with certain parts shown, in a vertical sectional view.

Referring now to FIGS. 3 and 4, there is shown a modified apparatus 176 which constitutes a self-supporting or separate unit suited for installation in a production line, e.g., between two grinding machines one of which treats the upper sides and the other of which treats the undersides (which are the upper sides after inversion or rechucking in the apparatus 176) of successive individual or grouped workpieces 201. The entire apparatus 176 rests on a floor-mounted frame 182 which carries idler rolls 181 serving to carry the weight of the apparatus 176 as well as to facilitate inversion of workpieces 201 by turning the entire apparatus through angles of 180°. The horizontal axis about which the apparatus 176 can turn through angles of 180° is indicated by a phantom line, as at 177. The apparatus 176 comprises two large-diameter coaxial annular or disc-shaped frame members 178, 179 each of which rests on a set of, for example, three idler rolls 181. The frame member 179 is provided with a coaxial ring gear 183 whose teeth mesh with the teeth of a pinion 184 on the output element of an electric motor 186 mounted on the frame 182. The motor 186 may constitute a stepping motor which is designed to complete a predetermined number of revolutions in response to closing of a manually or automatically actuatable switch, not shown. The number of revolutions is selected in such a way that the motor 186 comes to a halt when the frame member 179 is turned through 180°. The frame members 178, 179 are connected to each other by two horizontal crossheads 187 which are disposed mirror symmetrically to each other with reference to a plane including the axis 177. Each of the crossheads 187 carries a plurality of components. The components on one of the crossheads 187 are mirror images of components on the other crosshead and the two groups of components are disposed diametrically opposite each other with reference to the common axis 177 of the frame members 178, 179.

The lower crosshead 187 of FIGS. 3 and 4 supports a clamping unit 188 for a pallet 189. The clamping unit 188 is movable with reference to its crosshead 187 toward or away from the axis 177 and is guided during such movement by a pair of parallel tie rods 191 anchored in the crosshead 187. The means for moving the clamping unit 188 with reference to the crosshead 187 comprises a motor 193 mounted on the crosshead and serving to drive a feed screw 192 which meshes with a nut of or extends into a tapped bore in the clamping unit 188. That side of each pallet 189 which faces toward the nearest clamping unit 188 has a T-shaped groove 194 which is parallel to the axis 177 and receives the elongated heads 210 of two or more pivotable or turnable tighteners 196. The tighteners 196 are movable by hydraulically or pneumatically operated cylinder and piston units 195 so as to cause their heads 210 to engage or to relax the pressure against the adjacent surfaces in the T-groove 194 of the respective pallet 189. When the tighteners 196 are released, the pallet 189 can be moved lengthwise of its groove 194 by a linkage 197 serving to deliver pallets 189 to the apparatus 176 or by a linkage 198 serving to remove pallets from the apparatus 176, i.e., from the respective clamping unit 188.

Each of the two pallets 189 shown in FIGS. 3 and 4 carries a permanent-magnet plate chuck or carrier 199 which can attract one or more workpieces 201. The chucks 199 have polygonal protuberances 207 which can be rotated through 180° to thereby magnetize or demagnetize (activate or deactivate) the corresponding chucks. In other words, the protuberances 207 form part of activating and deactivating means corresponding to that shown at 126 in FIG. 2. Each of the two activating-deactivating means further comprises a wrench 206 which is mounted at one end of a reciprocable and rotatable headstock 204. Each headstock 204 is reciprocable in the directions indicated by the respective double-headed arrow 211 and is mounted on a supporting arm 202 secured to the corresponding clamping unit 188. Motors 203 serve to move the respective headstocks 204 axially so as to move the wrenches 206 into or from engagement with the respective protuberances 207. The means for turning the headstocks 204 back and forth (about their respective axes) through angles of 180° are not shown in FIGS. 3 and 4; such turning means can comprise first gears on the headstocks 204 or on the respective wrenches 206 and motor-driven second gears meshing with the first gears.

It will be noted that the surface at the underside of the upper plate chuck 199 fully overlaps the surface at the upper side of the lower chuck 199.

The operation of the apparatus 176 is as follows:

An empty pallet 189 (i.e., a pallet which supports a plate chuck 199 without workpieces 201) is held in a position of readiness by the upper clamping unit 188 of FIGS. 3 and 4. The lower clamping unit 188 is unoccupied, i.e., it does not support and lock a pallet 189 and the elongated heads 210 of its tighteners 196 are parallel to the axis 177. A loaded pallet 189 (i.e., a pallet supporting a plate chuck 199 with one or more workpieces 201 at the upper side of such chuck) is then delivered by the linkage 197 from a processing station, e.g., from a first grinding machine whose tool or tools have completed a preliminary or coarse and thereupon a final treatment of the upper side or surface of each workpiece 201. The protuberance 207 of the loaded plate chuck 199 is held in an angular position in which the chuck is activated, i.e., the chuck attracts the workpiece or workpieces 201 to its upper side.

As the loaded pallet 189 advances toward and onto the lower clamping unit 188 of FIGS. 3 and 4, its groove 194 receives the heads 210 of the tighteners 196, and such tighteners are then turned through 90° by the respective fluid-operated motor means 195 to positively and reliably secure the loaded pallet 189 to the lower clamping unit 188. The linkage 197 is then retracted so that it does not interfere with inversion of the components carried by the frame members 178, 179. The undersides of the heads 210 can have suitably configured cam faces which bear against the adjacent surfaces of the pallet 189 (i.e., against certain surfaces bounding the T-groove 194) after the respective motors 195 complete the angular displacement of the tighteners 196 through 90° so that the pallet 189 is properly locked to the respective clamping unit 188 prior to rotation of the frame members 178, 179 through 180 degrees.

In the next step, an automatic programming device or an attendant starts the motors 193 to move the two clamping units 188 toward each other, i.e., toward the axis 177, through the medium of the corresponding feed screws 192. The clamping units 188 slide along the respective pairs of tie rods 191 so that their orientation with reference to each other remains unchanged but the pallets 189 move nearer to each other. The directions in which the clamping units 188 are reciprocable relative to the corresponding crossheads 187 are indicated by double-headed arrows 208.

In the next step, the operator or an automatic programming unit starts the motor 186 so that the entire apparatus 176 is turned through 180° about the axis 177 as a result of rotation of the ring gear 183 under the action of the pinion 184. The rolls 181 rotate about their respective axes and enable the corresponding frame members 178, 179 to turn (see the arrows 209) about the axis 177 with a minimum of friction. When the motor 186 is arrested, the loaded pallet 189 is located at a level above the other pallet, i.e., the workpiece or workpieces 201 are attracted to the underside of the magnetized plate chuck 199 and the empty chuck 199 is located immediately below such workpiece or workpieces.

The motors 203 are thereupon started to move the corresponding headstocks 204 inwardly and to thereby engage the wrenches 206 with the respective protuberances 207. The wrenches 206 are then rotated through angles of 180° (with or relative to their headstocks 204) so that the lower (empty) plate chuck 199 is magnetized and the upper (loaded) plate chuck 199 is demagnetized. Thus, the workpiece or workpieces 201 adhere to the underside of the lower chuck 199. The motors 203 then retract the respective headstocks 204 to the illustrated positions, i.e., the wrenches 206 are disengaged from the respective protuberances 207 so that the upper plate chuck 199 remains demagnetized and the lower plate chuck 199 continues to attract the workpiece or workpieces 201 to its upper side. In the next step, the motors 193 are started to retract the two clamping units 188 to the illustrated positions or even beyond such positions, i.e., the plate chucks 199 move away from each other. The lower pallet 189 is then unclamped by appropriate angular displacement of the heads 210 of the corresponding tighteners 196 so that the linkage 198 can be advanced first to the left, as viewed in FIG. 3, to move below the loaded pallet 189 at both sides of the respective groove 194 (see the positions of the two components of the linkage 197 shown in FIG. 4), and the linkage 198 is then retracted to remove the loaded pallet 189 from the apparatus 176. The linkage 198 can deliver the loaded pallet 189 to a next or second grinding machine whose tool or tools treat the upper side or sides of the workpiece or workpieces 201 on the magnetized plate chuck 199. The empty plate chuck 199 remains demagnetized and is held in a position of readiness to accept the next workpiece or workpieces 201 which are delivered by the next loaded pallet 189 in the aforedescribed manner.

It will be appreciated that the motors 193 and the feed screws 192 can be omitted, together with the tie rods 191, if the thickness of all workpieces 201 is the same, i.e., if the distance between the two plane parallel surfaces of each workpiece is constant. In such instances, it suffices to effect an initial accurate adjustment of the positions of clamping units 188 with reference to the associated crossheads 187, whereupon the positions of such clamping units relative to the crossheads and frame members 178, 179 remain unchanged.

The permanent-magnet plate chucks 199 can be replaced with electromagnetic plate chucks or with chucks comprising combinations of permanent magnets and electromagnets. If each of the chucks 199 embodies one or more electromagnets, the apparatus 176 must be connected with or each pallet 189 must carry a suitable source of electrical energy. Alternatively, the pallets 189 are then provided with terminals which are automatically engaged by conductors (e.g., bus bars) for electrical energy as soon as the pallets are properly located with reference to their clamping units.

It is further within the purview of the invention to mount the frame members 178 and 179 in such a way that they can turn through 180 degrees about a vertical (rather than horizontal) or about an otherwise oriented axis. The selection of orientation of the axis 177 depends on the nature and positions of machines and devices which supply loaded pallets 189 to and receive loaded and inverted pallets from the apparatus 176.

The provision of motors 193, feed screws 192 and tie rods 191 is optional but desirable and advantageous because this renders it possible to utilize the apparatus 176 for rechucking of relatively thin or relatively thick workpieces. If the workpieces 201 are relatively thin, the extent of movement of pallets 189 toward each other is pronounced; the distance between the pallets, one of which carries one or more relatively thick workpieces, must be changed very little or not at all before such workpiece or workpieces can be transferred from a loaded chuck 199 onto an empty chuck. The transfer can take plate even before the motor 186 is started to turn the apparatus 176 through 180°, i.e., inversion of the clamping units 188 can precede or follow the magnetizing or activation of the upper plate chuck and simultaneous demagnetizing or deactivation of the lower plate chuck.

The pallets 189 are also optional, i.e., the chucks 199 can be designed for connection or clamping directly to the corresponding clamping units 188. Pallets are preferred if they are needed at the station preceding or following the apparatus 176.

An important advantage of the improved apparatus is that the workpieces can be rechucked during movement from station to station or during movement from machine to machine with minimal losses in time, with a high degree of accuracy and reproducibility, and without resort to manual labor. The rechucking can be completed within a fraction of the time which is needed when one or more attendants are in charge of manually transferring workpieces from a preceding carrier onto a next-following carrier. All that is necessary to provide two or more carriers which at least partially overlap each other so that the rechucking operation can be effected and completed while one or more workpieces rest on or depend from one of the carriers and are simultaneously overlapped by the other carrier. If the carriers 26 to 28 of the apparatus shown in FIGS. 1 and 2 are operated intermittently, idle times between successive incremental advances of the carriers by an indexing mechanism or the like together amount to a very small fraction of the time which is required to effect the transfer of workpieces from a first carrier onto a second carrier and thereupon from the second carrier onto a third carrier by hand as is customary in heretofore known machine tools for treatment of both surfaces of workpieces having plane parallel surfaces.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for supporting, locating and transferring workpieces, particularly workpieces having pairs of plane parallel surfaces, for removal of material at a succession of stations, comprising work holder means including at least two spaced-apart work carriers having fully overlapping parallel surfaces which face each other, each of said carriers being activatable to attract workpieces to its surface and deactivatable to release such workpieces so that a workpiece between the surfaces of the carriers can be transferred from one of said carriers to the other of said carriers by deactivating the one carrier while the other carrier is activated; means for moving said carriers relative to each other in directions to increase or reduce the distance between the surfaces of such carriers; a self-sustaining frame for said carriers; a pallet for each of said carriers; means for delivering pallets with carriers to said frame; means for removing pallets with carriers from said frame; and means for turning said frame about a predetermined axis to thereby reverse the positions of said carriers, said axis being parallel to the surfaces of said carriers.

2. The apparatus of claim 1, wherein said carriers are mobile plate chucks.

3. The apparatus of claim 1, wherein said carriers include magnets adapted to attract magnetizable workpieces.

4. The apparatus of claim 1, wherein said moving means comprises a clamping unit for each of said carriers and motor means for moving such clamping units toward or away from each other.

5. The apparatus of claim 1, wherein the surfaces of said carriers are horizontal.

* * * * *